United States Patent
Guevara et al.

(10) Patent No.: US 11,093,431 B2
(45) Date of Patent: Aug. 17, 2021

(54) AUTOMATED DEVICE DISCOVERY SYSTEM

(71) Applicant: Dell Products L.P., Round Rock, TX (US)

(72) Inventors: Alberto David Perez Guevara, Pflugerville, TX (US); Jeffrey L. Kennedy, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/159,347

(22) Filed: Oct. 12, 2018

(65) Prior Publication Data

US 2020/0117631 A1 Apr. 16, 2020

(51) Int. Cl.
*G06F 13/40* (2006.01)
*G06F 13/10* (2006.01)
*G06F 13/362* (2006.01)

(52) U.S. Cl.
CPC ........ *G06F 13/4081* (2013.01); *G06F 13/102* (2013.01); *G06F 13/362* (2013.01); *G06F 13/4022* (2013.01)

(58) Field of Classification Search
None
See application file for complete search history.

(56) References Cited

U.S. PATENT DOCUMENTS

| | | | | |
|---|---|---|---|---|
| 7,457,906 B2* | 11/2008 | Pettey | ................. | G06F 13/4022 370/357 |
| 2004/0153844 A1* | 8/2004 | Ghose | ................... | H04L 41/064 714/42 |
| 2004/0172494 A1* | 9/2004 | Pettey | ................. | G06F 13/4022 710/305 |
| 2005/0216619 A1* | 9/2005 | Parrish | ................ | G06F 13/4022 710/62 |
| 2006/0059287 A1* | 3/2006 | Rivard | .................. | G06F 9/4411 710/300 |
| 2009/0089464 A1* | 4/2009 | Lach | .................... | G06F 13/4022 710/62 |
| 2012/0131249 A1* | 5/2012 | Cepulis | ................... | G06F 1/189 710/269 |
| 2013/0103644 A1* | 4/2013 | Shoens | ............... | G06F 16/1873 707/638 |

(Continued)

*Primary Examiner* — Henry Tsai
*Assistant Examiner* — Christopher A Bartels
(74) *Attorney, Agent, or Firm* — Haynes and Boone, LLP

(57) ABSTRACT

An automated device discovery system includes a chassis defining device slots, with device connectors located adjacent each of the device slots. A bus subsystem and a reset subsystem are coupled to the device connectors. A processing system, which is coupled to each of the at least one bus system and the reset subsystem, causes the reset subsystem to sequentially assert reset instructions through each of the device connectors in a device slot sequence. The processing system then sequentially detects, via bus paths in the bus subsystem, each device that is located in one the device slots and coupled to its respective device connector based on reset operations performed by that device in response to the sequentially asserted reset instructions. The processing system then maps each device that was detected with a respective device slot identifier that corresponds to the device slot sequence in which the reset instructions were asserted.

17 Claims, 5 Drawing Sheets

(56) References Cited

U.S. PATENT DOCUMENTS

| | | | |
|---|---|---|---|
| 2013/0325998 A1* | 12/2013 | Hormuth | G06F 15/17331 |
| | | | 709/212 |
| 2016/0365155 A1* | 12/2016 | Kim | G06F 13/4081 |
| 2017/0063965 A1* | 3/2017 | Grenader | G06F 9/4881 |
| 2017/0090948 A1* | 3/2017 | Waidhofer | G06F 13/4282 |
| 2017/0286349 A1* | 10/2017 | Edirisooriya | G06F 13/4081 |
| 2017/0315841 A1* | 11/2017 | Kobayashi | G06F 9/542 |
| 2018/0032471 A1* | 2/2018 | Olarig | H04L 49/9068 |
| 2018/0167268 A1* | 6/2018 | Liguori | H04L 67/2814 |
| 2018/0213669 A1* | 7/2018 | Kochukunju | G06F 1/32 |
| 2019/0109720 A1* | 4/2019 | Olarig | H04L 12/44 |
| 2020/0117631 A1* | 4/2020 | Guevara | G06F 13/4022 |

* cited by examiner

AUTOMATED DEVICE DISCOVERY SYSTEM

BACKGROUND

The present disclosure relates generally to information handling systems, and more particularly to automatically discovering devices in information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, servers, often include device slots that are utilized in coupling devices to the server. For example, many server devices define a plurality of hard drive slots and provide connectors adjacent those slots that may be utilized to couple a plurality of hard drives such as, for example, Non-Volatile Memory express (NVMe) Solid State Drives (SSDs), to buses in the server that are coupled to a processing system. In conventional servers, it is often desirable to identify each of the NVMe SSDs coupled to the server for the purposes of, for example, inventory, maintenance, trouble shooting, and error handling. As such, servers are often configured to provide Basic Input/Output System (BIOS) menus with setup user interfaces that display information that enhances serviceability of the servers by allowing the user to identify any NVMe coupled to the server. For example, such information may include a hard drive bay identifier and hard drive slot identifier linked to a hardware information topology such as, for example, a Peripheral Device Interconnect express (PCIe) Bus:Device:Function (B:D:F) configuration space address.

Conventionally, the display of such information requires software that has been provided with some knowledge of the server chassis and/or components. However, unlike hardware components utilized with the server such as PCIe cards and Universal Serial Bus (USB) devices, the server chassis and/or its mechanical features are not self-describing (i.e., they cannot provide the information about themselves to the system) and, as such, there is no standard/automated method to obtain or derive information about them. As such, conventional techniques for providing such information rely on static descriptions of the mapping and/or linking of server components in hard coded, static mapping tables in the BIOS (or software components that utilize those tables). However, such static mapping tables require manual entry for each server implementation, and thus do not provide a flexible approach with regard to reuse across different server platforms or configurations (i.e., static mapping tables must be created from scratch for each new platform and differing platform configuration). For example, the static mapping tables often must be created and maintained as new variations of server components and/or configuration are introduced (e.g., backplane changes, cabling changes, etc), which is time consuming for software developers, who must track mechanical component changes across entire platform portfolios and ensure corresponding changes are reflected in the static mapping tables. As such, changes in modular hardware components such as backplanes may require changes to the software static mapping tables, making enhancements to the module hardware undesirable in many situations. Furthermore, a hardware schematic is often the only documentation available for identifying the buses and other links available to provide signals between the processing system and device slots, and in complex systems multiple schematics and cable wiring diagrams are often required to trace the paths from PCIe root ports to end point devices via the many connections available in a server.

Accordingly, it would be desirable to provide an automated device discovery system.

SUMMARY

According to one embodiment, an Information Handling System (IHS) includes a processing system; and a memory system that is coupled to the processing system and that includes instructions that, when executed by the processing system, cause the processing system to: cause a reset subsystem to sequentially assert reset instructions in a device slot sequence through a plurality of device connectors that are each located adjacent a respective device slot defined by a chassis; sequentially detect, via a respective bus path in at least one bus subsystem that is coupled to each of the plurality of device connectors, each device that is located in one the respective device slots and coupled to one of the plurality of device connectors based on reset operations performed by that device in response to the sequentially asserted reset instructions; and mapping, in a database, each device that was detected with a respective device slot identifier that corresponds to the device slot sequence in which the reset instructions were asserted.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
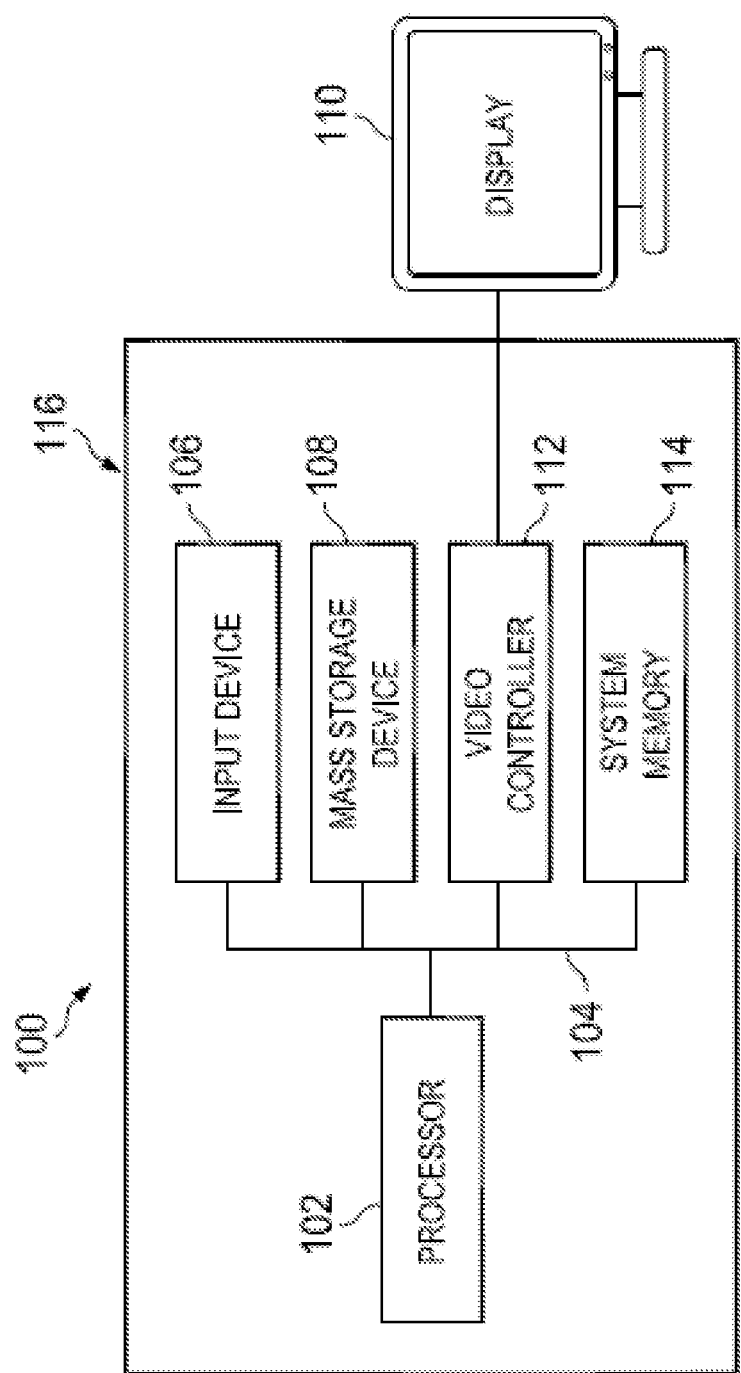
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
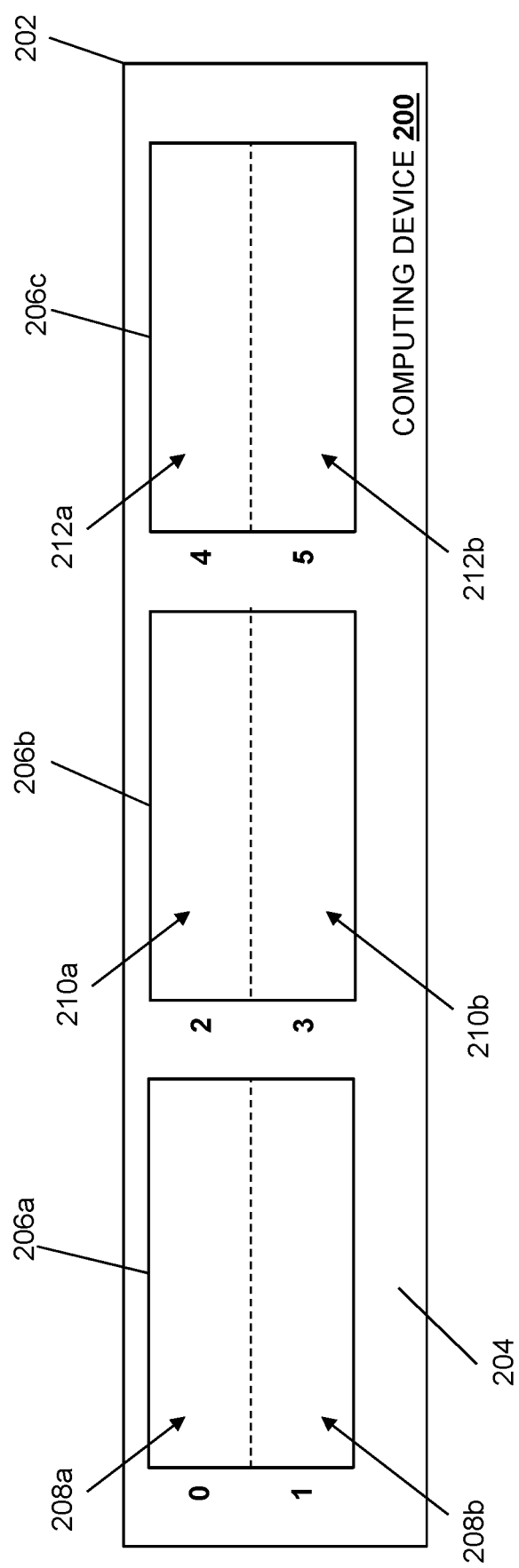
FIG. 2 is a front view illustrating an embodiment of a computing device including a plurality of device slots.

Referring now to FIG. 2, an embodiment of a computing device 200 is illustrated that may be provided by the IHS 100 discussed above with reference to FIG. 1, and/or that may include any or all of the components of the IHS 100. In a specific example, the computing device 200 may be provided by a server device, although storage devices, networking devices, and/or other devices known in the art may benefit from the teachings of the present disclosure and thus fall within its scope as well. In the illustrated embodiment, the computing device 200 includes a chassis 202 that houses the components of the computing device 200, only some of which are illustrated in FIG. 2. The illustrated embodiment, the chassis 202 includes a front wall 204 that defines a plurality of storage device openings 206a, 206b, and 206c, with each storage device opening providing a pair of storage device slots such as the storage device slots 208a and 208b provided by the storage device opening 206a, the storage device slots 210a and 210b provided by the storage device opening 206b, and the storage device slots 212a and 212b provided by the storage device opening 206c. As discussed below, the storage device openings 206a-c and storage device slots 208a, 208b, 210a, 210b, 212a, and 212b may belong to a particular storage device bay, and while only a single storage device bay is illustrated in FIG. 2, computing devices may include a plurality of storage device bays while remaining within the scope of the present disclosure. While not illustrated in detail, one of skill in the art in possession of the present disclosure will recognize that the storage device slots 208a, 208b, 210a, 210b, 212a, and 212b extend into the chassis 202, which may include storage device connectors, storage device coupling securing features, and/or a variety of other components while remaining within the scope of the present disclosure.

Furthermore, the surface of the wall 204 of the chassis 202 includes a storage device slot identifier for each of the storage device slots, which in the illustrated embodiment includes a "0" for the storage device slot 208a, a "1" for the storage device slot 208b, a "2" for the storage device slot 210a, a "3" for the storage device slot 210b, a "4" for the storage device slot 212a, and a "5" for the storage device slot 212b. One of skill in the art in possession of the present disclosure will recognize that the storage device slot identifiers may be printed on the surface of the wall 204 of the chassis 200, etched on the surface of the wall 204 of the chassis 200, and/or provided in any other manner while remaining within the scope of the present disclosure. However, while a specific computing device 200 having a chassis 202 defining three storage device openings that provide six storage device slots that are part of a storage device bay has been illustrated and described, one of skill in the art in possession of the present disclosure will recognize that a chassis may define any number of bays providing any number of device slots for a variety of types of devices while remaining within the scope of the present disclosure as well.

Figure 3:
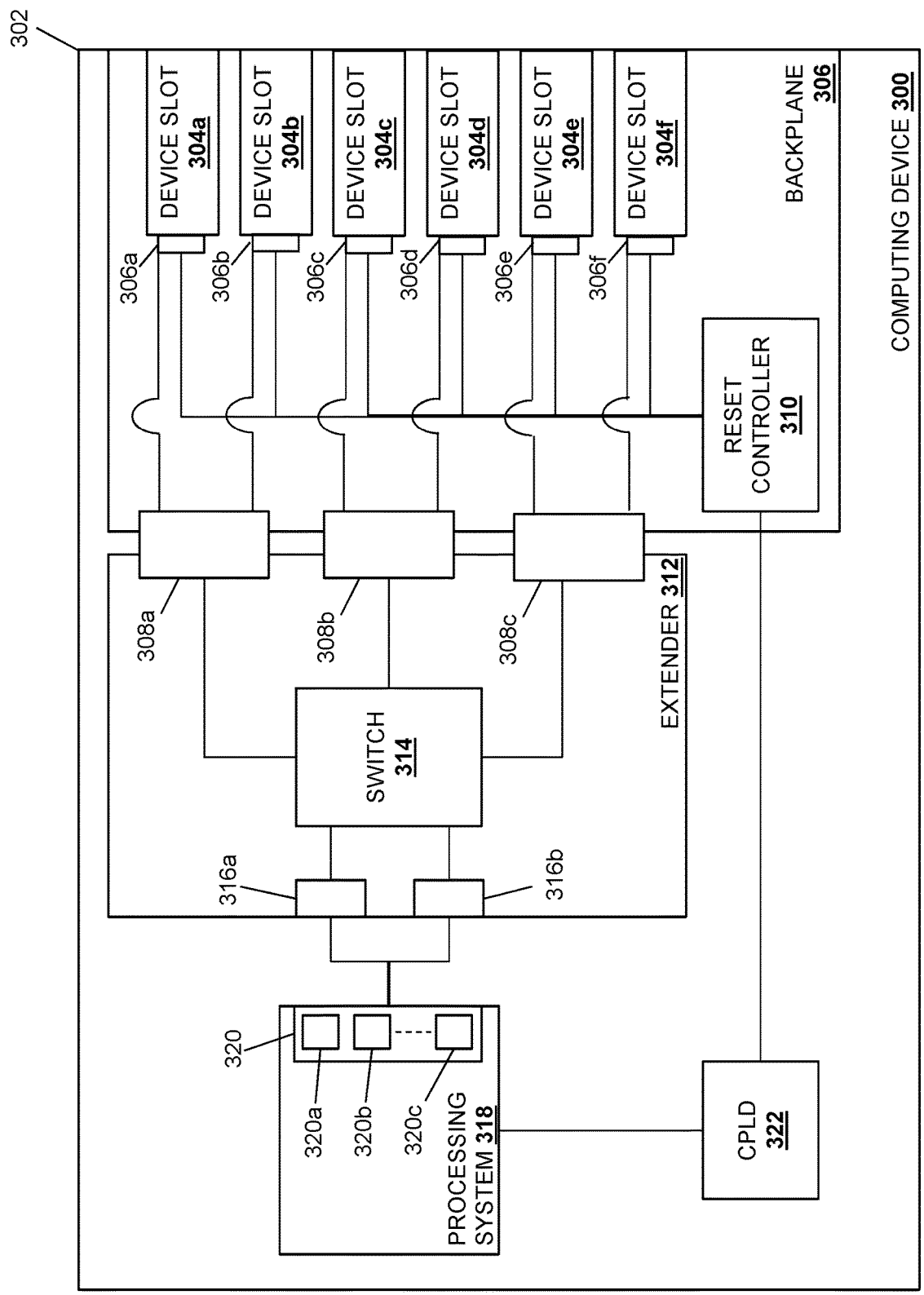
FIG. 3 is a schematic view illustrating an embodiment of an automatic device discovery system provided in a computing device.

Referring now to FIG. 3, an embodiment of a computing device 300 that may include the features of the computing device 200 discussed above with reference to FIG. 2, is illustrated. As such, the computing device 300 may be provided by the IHS 100 discussed above with reference to FIG. 1, and/or may include some or all of the components of the IHS 100, and in specific examples may be provided by a server device (although storage devices, networking devices, and/or other devices known in the art may benefit from the teachings of the present disclosure and thus fall within its scope as well.) In the illustrated embodiment, the computing device 300 includes a chassis 302 that houses the components of the computing device 300, only some of which are illustrated in FIG. 3. The chassis 302 defines a plurality of device slots 304a, 304b, 304c, 304d, 304e, and 304f which, as discussed below, may be provided by the storage device slots 208a and 208b, the storage device slots 210a and 210b, and the storage device slots 212a and 212b, respectively, discussed above with reference to FIG. 2. As such, the device slots 304a and 304 may be provided in a first device opening (e.g., the storage device opening 206a), the device slots 304c and 304d may be provided in a second device opening (e.g., the storage device opening 206b), and the device slots 304e and 304f may be provided in a third device opening (e.g., the storage device opening 206c.)

The chassis 302 may also house a backplane 306 that includes a plurality of device connectors such as, for example, the device connector 306a positioned adjacent the device slot 304a, the device connector 306b positioned adjacent the device slot 304b, the device connector 306c positioned adjacent the device slot 304c, the device connector 306d positioned adjacent the device slot 304d, the device connector 306e positioned adjacent the device slot 304e, and the device connector 306f positioned adjacent the device slot 304f. As discussed above, the backplane 306 may be associated with a device bay associated with the device slots 304a-f and the device connectors 306a-f, and the computing device 300 may include other backplanes having device connectors located adjacent device slots and associated with other devices bays while remaining within the scope of the present disclosure as well. In the examples provided below, the device connectors 306a-f are PCIe device connectors such as, for example, NVMe storage device connectors. However, other devices may benefit from the teachings of the present disclosure, and thus other device connectors will fall within its scope as well. The backplane 304 also includes a plurality of extender connectors 308a, 308b, and 308c, with the extender connector 308a coupled to the device connectors 306a and 306b, the extender connector 308b coupled to the device connectors 306c and 306d, and the extender connector 308c coupled to the device connectors 306e and 306f. As discussed below, the computing device 300 may include a reset subsystem that, in the illustrated embodiment, includes a reset controller 310 that is provided on the backplane 306 and coupled to each of the device connectors 306a-d.

The chassis 302 may also house an extender 312 that is coupled to the extender connectors 308a-c, and that includes a switch 314 (e.g., a PCIe switch) that is coupled to each of the extender connectors 308a-c. The extender 312 may also include a plurality of processing system connectors 316a and 316b that are each coupled to the switch 314. The chassis 302 also houses a processing system 318 that may include, for example, the processor 102 discussed above with reference to FIG. 1. In many of the embodiments discussed below, the processing system 318 provides a Basic Input/Output System (BIOS) that may include by non-volatile firmware, and that may be configured to perform hardware initialization during a computing device boot process, as well as provide for runtime services for operating systems and programs, in addition to the functionality discussed below. However, while referred to as a BIOS below, one of skill in the art in possession of the present disclosure will recognize that the BIOS of the present disclosure may be provided according to the Unified Extensible Firmware Interface (UEFI) specification, which defines a software interface between an operating system and platform firmware, and which has been provided to replace conventional BIOS firmware interfaces. Furthermore, the processing system 318 may also include a Central Processing Unit (CPU) that performs the functionality of the processing system described below, either by itself or in cooperation with the BIOS. However, while a few examples are provided, one of skill in the art in possession of the present disclosure will recognize that a variety of processing components may enable the functionality discussed below while remaining within the scope of the present disclosure as well.

In the specific embodiment illustrated in FIG. 3, the processing system 318 includes (or is coupled to) a root complex 320 (e.g., a Peripheral Component Interconnect express (PCIe) root complex) that is coupled to each of the processing system connectors 316a and 316b on the extender 312. The root complex 320 includes a plurality of root ports 320a, 320b, and up to 320c (e.g., PCIe root ports). However, other features for coupling the processing system 304 to components in the computing device 300 will fall within the scope of the present disclosure as well. In the examples provided below, the couplings provided on and between the processing system 318, the extender 312, and the backplane 306 (e.g., the device connectors 306a-e on the backplane 306) provide at least one bus subsystem that one of skill in the art will recognize includes a variety of bus paths between the processing subsystem 318 and the device connectors 306a-f on the backplane 306. Furthermore, the reset subsystem that may be included in the computing device 300 as discussed above may also be provided by a Complex Programmable Logic Device (CPLD) 322 that is coupled to each of the processing system 318 and the reset controller 310. However, while a specific computing device 300 has been illustrated and described, one of skill in the art in possession of the present disclosure will recognize that computing devices provided according to the teachings of the present disclosure may include a variety of components and/or component configurations for providing conventional computing device functionality, as well as the functionality discussed below, while remaining within the scope of the present disclosure.

Figure 4:
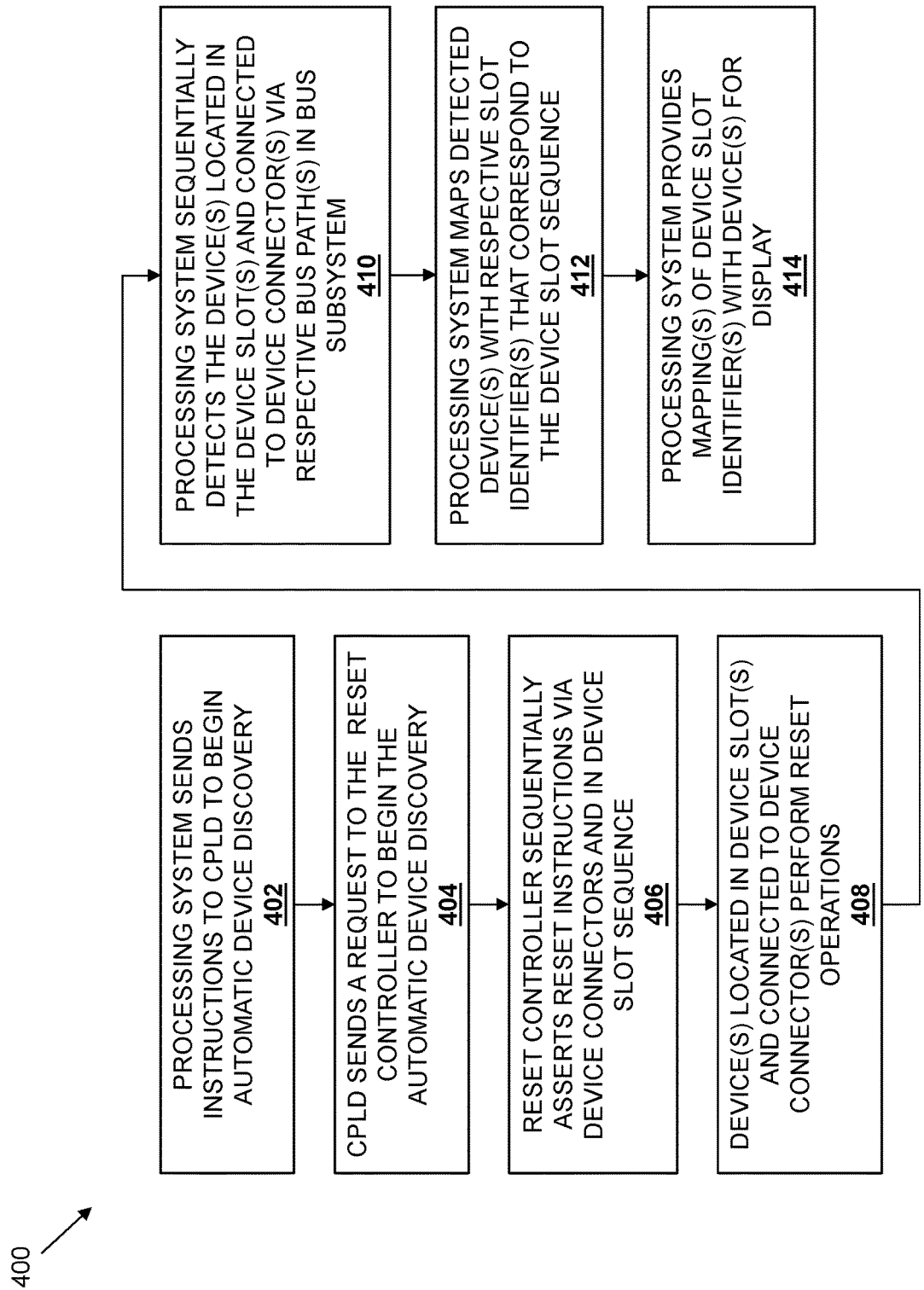
FIG. 4 is a flow chart illustrating an embodiment of a method for automatically discovering devices.

Referring now to FIG. 4, an embodiment of a method 400 for providing automatic device discovery is illustrated. As discussed below, the systems and methods of the present disclosure provide for the dynamic discovery of devices such as, for example, NVMe storage devices in storage device slots included in a storage device bay, thus eliminating the need to create and maintain static mapping tables used to map those device to their device slots. For example, a computing device may include a CPLD may be configured to communicate with device connectors that are located on a backplane and that are positioned adjacent respective device slots defined by a computing device chassis, as well as with a processing system (e.g., a BIOS) included in the computing device. During computing device initialization, the processing system may send instructions to the CPLD to begin a device discovery process, and the CPLD may provide a request to a reset controller on the backplane to begin the device discovery process. The reset controller may then sequentially assert reset instructions through each of the device connectors in a device slot sequence (e.g., in a sequential device slot order such as device slot "0", device slot "1", etc.), which causes device(s) connected to the device connectors to sequentially perform reset operations. The processing system will then sequentially detect, via a respective bus path in the computing device, each of those devices based on, for example, an associated state change that is registered on a corresponding root port to which the device is connected, which allows the processing system to map each device with a respective device slot identifier that corresponds to the device slot sequence. The processing system may then display the mapping of the device slot identifiers with each device that was detected. As such, flexibility and modularity are enabled in future platform designs, reducing firmware development requirements via the elimination of the need to create and maintain static mapping tables.

Figure 5:
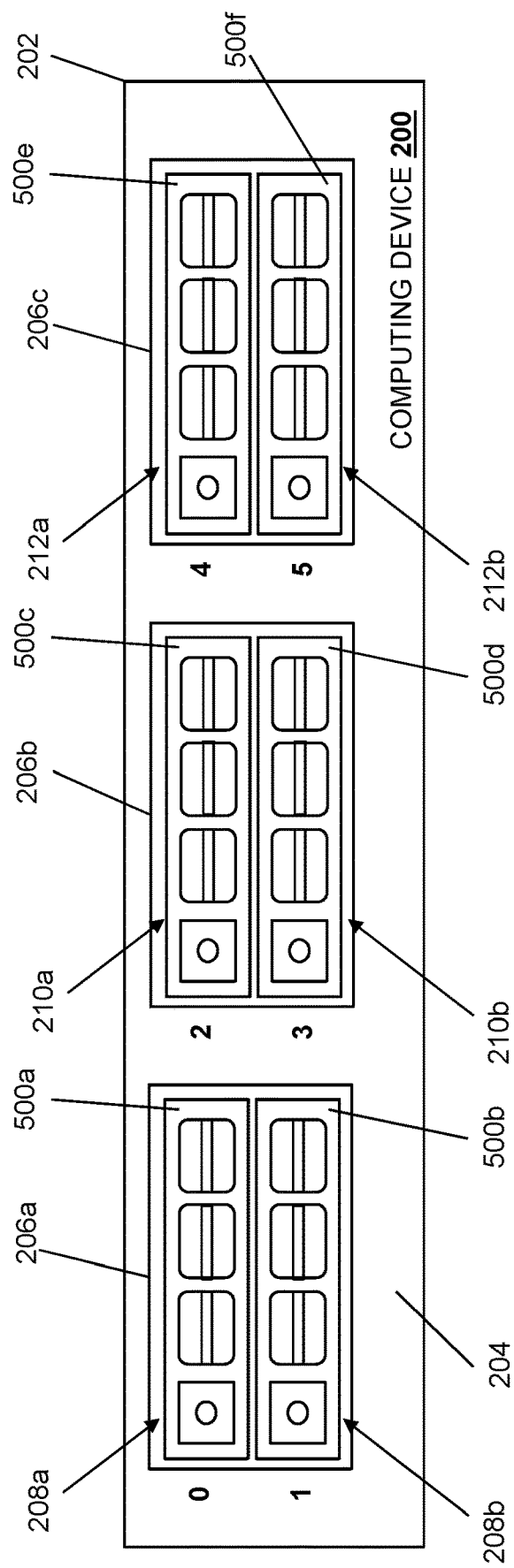
FIG. 5 is a front view illustrating an embodiment of a plurality of devices positioned in the device slots n the computing device of FIG. 2.

The method 400 begins at block 402 where a processing system sends instructions to a CPLD to begin automatic device discovery. With reference to FIG. 3, at or prior to block 402, one or more devices may be positioned in the device slots 304a-f defined by the computing chassis 302 of the computing device 300 such that those device(s) engage respective device connectors 306a-f in the computing device 300. For example, FIG. 5 illustrates NVMe storage devices (e.g., NVMe Solid State Drives (SSDs)) in the storage device slots on the computing device 200, with an NVMe storage device 500a positioned in the storage device slot 208a (and coupled to a device connector such as the device connector 306a of FIG. 3), an NVMe storage device 500b positioned in the storage device slot 208b (and coupled to a device connector such as the device connector 306b of FIG. 3), an NVMe storage device 500c positioned in the storage device slot 210a (and coupled to a device connector such as the device connector 306c of FIG. 3), an NVMe storage device 500d positioned in the storage device slot 210b (and coupled to a device connector such as the device connector 306d of FIG. 3), an NVMe storage device 500e positioned in the storage device slot 212a (and coupled to a device connector such as the device connector 306e of FIG. 3), and an NVMe storage device 500f positioned in the storage device slot 212b (and coupled to a device connector such as the device connector 306f of FIG. 3). However, as discussed above, while a specific example of NVMe storage devices has been provided, one of skill in the art in possession of the present disclosure will recognize that other PCIe devices (which utilize reset signals like those discussed for the NVMe storage devices below), and/or other devices (that utilize signals that provide the functionality associated with the reset signals discussed below) may be provided in the device discovery system of the present disclosure while remaining within its scope as well.

In an embodiment, at block 402, the computing device 300 may start up (e.g., begin a boot process), reboot, or otherwise be initialized. However, while the systems and methods of the present disclosure are discussed as operating during a boot process, one of skill in the art in possession of the present disclosure will recognize that the teachings of the present disclosure may be applied to a computing device during runtime (e.g., to provide for discovery of hot-plugged devices) while remaining within the scope of the present disclosure as well. As such, in one example, a BIOS provided by the processing system 318 may operate to begin an initialization process (e.g., a UEFI initialization process or "platform boot") and, during that initialization process, may generate and send automatic device discovery instructions to the CPLD 322. For example, the automatic device discovery instructions may be directed to a mapped register in the CPLD 322, and may be configured to initiate a device discovery sequence for a device bay or backplane 306. As such, the automatic device discovery instructions may identify the backplane 306, a device bay provided by the backplane 306, and/or any other information that one of skill in the art in possession of the present disclosure would recognize as allowing for the device discovery discussed below. As discussed above, while only a single backplane 306/device bay is illustrated in FIG. 3, the may include multiple backplanes/device bays, and the processing system 318 may identify any of those backplanes in the automatic device discovery instructions generated and transmitted during the method 400.

In some embodiments, the during the initialization process, the BIOS provided by the processing system may perform a device scan to detect the devices and determine whether they are compatible with the automatic device discovery operations discussed below. For example, the BIOS provided by the processing system may perform a device scan to determine whether the devices are NVMe storage devices, PCIe devices, and/or are any type of device available for discovery via the functionality discussed below. As such, the method 400 may operate on particular devices (e.g., the NVMe storage devices discussed below) while ignoring other devices, may operate on particular types of devices (e.g., PCIe devices) while ignoring other types of devices, and/or may operate with any combination of devices that may be detected by the initialization device scan.

The method 400 then proceeds to block 404 where the CPLD sends a request to a reset controller to begin the automatic device discovery. In an embodiment, at block 404, the CPLD 322 may receive the automatic device discovery instructions from the processing system 318 and, in response, send a request to the reset controller 310 to begin the automatic device discovery. For example, the CPLD 322 may use the automatic device discovery instructions to identify the backplane 306, the device bay provided by the backplane 306, and/or other information about the device(s) to be discovered and, in response, generate and send a request to begin the automatic device discovery to the reset controller 310 included on the backplane 306 identified in the automatic device discovery instructions. As discussed above, while only a single backplane 306/device bay is illustrated in FIG. 3, the CPLD 322 may be coupled to multiple backplanes/device bays, and may generate and send requests to any of those backplanes/device bays (e.g., as identified by the processing system in the automatic device discovery instructions) during the method 400. In a specific example, the request generated and transmitted by the CPLD 322 to the reset controller 310 may be transmitted via a 1-wire communication link to the reset controller 310. One of skill in the art in possession of the present disclosure will recognize that 1-wire communication schemes have been developed to exchange information between components like the CPLD 322 and components like the backplane 306 (e.g., via a microchip embedded in the component), and the term "1-wire" refers to limiting use of traces and/or cables to "one wire rather than requiring independent lines for transmit signals, receive signals, clock signals, command signals, and/or or any other signals sent over a communication link or lane. However, multi-wire communication links are envisioned as falling within the scope of the present disclosure as well.

The method 400 then proceeds to block 406 where the reset controller sequentially asserts reset instructions via device connectors and in a device slot sequence. In an embodiment, at block 406, the reset controller 310 on the backplane 306 receives the request generated and transmitted by the CPLD 322 at block 404 and, in response, will operate to assert reset commands (e.g., local PCIe resets) through each of the device connectors in a device slot sequence. For example, a device slot sequence in the reset controller 310 may be associated with the device connectors 306a-f such that the device connector 306a is associated with a "device slot 0" in the device slot sequence, the device connector 306b is associated with a "device slot 1" in the device slot sequence, the device connector 306c is associated with a "device slot 2" in the device slot sequence, the device connector 306d is associated with a "device slot 3" in the device slot sequence, the device connector 306e is associated with a "device slot 4" in the device slot sequence, and the device connector 306f is associated with a "device slot 5" in the device slot sequence.

As such, with reference to both FIGS. 2 and 3, the positioning of the backplane 306 in the chassis 202/302 of the computing device 200/300 (i.e. prior to the method 400) may provide the device connector 306a adjacent the device slot 304a/storage device slot 208a that is associated with the storage device identifier "0" printed on the surface of the wall 204 of the chassis 202, may provide the device connector 306b adjacent the device slot 304b/storage device slot 208b that is associated with the storage device identifier "1" printed on the surface of the wall 204 of the chassis 202, may provide the device connector 306c adjacent device slot 304c/storage device slot 210a that is associated with the storage device identifier "2" printed on the surface of the wall 204 of the chassis 202, may provide the device connector 306d adjacent device slot 304d/storage device slot 210b that is associated with the storage device identifier "3" printed on the surface of the wall 204 of the chassis 202, may provide the device connector 306e adjacent device slot 304e/storage device slot 212a that is associated with the storage device identifier "4" printed on the surface of the wall 204 of the chassis 202, and may provide the device connector 306f adjacent device slot 304f/storage device slot 212b that is associated with the storage device identifier "5" printed on the surface of the wall 204 of the chassis 202.

Thus, the sequential assertion of reset signals in the device slot sequence by the reset controller 310 may include the assertion of a first reset signal via the device connector 306a to a device (e.g., the NVMe storage device 500a) positioned in the device slot 304a/storage device slot 208a, followed by the assertion of a second reset signal via the device connector 306b to a device (e.g., the NVMe storage device 500b) positioned in the device slot 304b/storage device slot 208b, followed by the assertion of a third reset signal via the device connector 306c to a device (e.g., the NVMe storage device 500c) positioned in the device slot 304c/storage device slot 210a, followed by the assertion of a fourth reset signal via the device connector 306d to a device (e.g., the NVMe storage device 500d) positioned in the device slot 304d/storage device slot 210b, followed by the assertion of a fifth reset signal via the device connector 306e to a device (e.g., the NVMe storage device 500e) positioned in the device slot 304e/storage device slot 212a, and followed by the assertion of a sixth reset signal via the device connector 306f to a device (e.g., the NVMe storage device 500f) positioned in the device slot 304f/storage device slot 212b.

The method 400 then proceeds to block 408 where device(s) located in device slot(s) and connected to the device connector(s) perform reset operations. In an embodiment, at block 408, any device (e.g., the NVMe storage devices 500a-f) positioned in a device slot 304a-f/storage device slot 208a, 208b, 210a, 210b, 212a, and 212b may, in response to receiving the assertion of a reset signal by the reset controller at block 406, perform reset operations. For example, reset operations provided by an NVMe storage device may include the initiation of a Controller Level Reset on all controllers that make up the NVM subsystem and a transition to the Detect LTSSM state by all PCI Express ports of the NVM subsystem. In addition, the occurrence of an NVM Subsystem Reset while power is applied to the NVM subsystem may be reported by the initial value of the CSTS.NSSRO field following the NVM Subsystem Reset (the CSTS.NSSRO field may be used by host software to determine if the sudden loss of communication with a controller was due to an NVM Subsystem Reset or some other condition).

As such, in response to the first reset signal asserted via the device connector 306a by the reset controller 310, the device positioned in the device slot 304a (e.g., the NVMe storage device 500a positioned in the storage device slot 208a) may perform reset operations. Subsequently (e.g., following the reset operations performed by the NVMe storage device 500a and the associated detection of that NVMe storage device 500a by the processing system 318 at block 410, discussed below), in response to the second reset signal asserted via the device connector 306b by the reset controller 310, the device positioned in the device slot 304b (e.g., the NVMe storage device 500b positioned in the storage device slot 208b) may perform reset operations. Subsequently (e.g., following the reset operations performed by the NVMe storage device 500b and the associated detection of that NVMe storage device 500b by the processing system 318 at block 410, discussed below), in response to the third reset signal asserted via the device connector 306c by the reset controller 310, the device positioned in the device slot 304c (e.g., the NVMe storage device 500c positioned in the storage device slot 210a) may perform reset operations. Subsequently (e.g., following the reset operations performed by the NVMe storage device 500c and the associated detection of that NVMe storage device 500c by the processing system 318 at block 410, discussed below), in response to the fourth reset signal asserted via the device connector 306d by the reset controller 310, the device positioned in the device slot 304d (e.g., the NVMe storage device 500d positioned in the storage device slot 210b) may perform reset operations. Subsequently (e.g., following the reset operations performed by the NVMe storage device 500d and the associated detection of that NVMe storage device 500d by the processing system 318 at block 410, discussed below), in response to the fifth reset signal asserted via the device connector 306e by the reset controller 310, the device positioned in the device slot 304e (e.g., the NVMe storage device 500e positioned in the storage device slot 212a) may perform reset operations. Subsequently (e.g., following the reset operations performed by the NVMe storage device 500e and the associated detection of that NVMe storage device 500e by the processing system 318 at block 410, discussed below), in response to the sixth reset signal asserted via the device connector 306f by the reset controller 310, the device positioned in the device slot 304f (e.g., the NVMe storage device 500f positioned in the storage device slot 212b) may perform reset operations.

The method 400 then proceeds to block 410 where the processing system sequentially detects the device(s) located in the device slot(s) and connected to device connector(s) via respective bus path(s) in a bus subsystem. In an embodiment, at block 410, the performance of reset operations by any device(s) located in device slots 304a-f may be detected by the BIOS provided by processing system 318 sequentially as those reset operations are performed. Furthermore, as discussed above, the couplings provided on and between the processing system 318, the extender 312, and the backplane 306 (e.g., the device connectors 306a-e on the backplane 306) provide at least one bus subsystem in the computing device 300, and one of skill in the art will recognize that different bus paths within that bus subsystem will provide the connections between the processing subsystem 318 and the different device connectors 306a-f on the backplane 306 that are coupled to the devices that are detected at block 410. As such, the BIOS provided by the processing system 318 may detect the reset operations performed by any particular device connected to one of the device connectors 306a-f and, in addition, may identify the bus path between the processing system 318 and that device connector. For example, each of the device connectors 306a-f may be coupled to a particular root port 320a-c in the root complex 320 via a particular bus path in the bus subsystem, and reset operations performed by a device connected to one of the device connectors 306a-f may be detected via a root port change in a corresponding root port that is coupled to that device connector via a particular bus path. As discussed below, in some embodiments, any root port change in a root port may correspond to a Bus:Device: Function (B:D:F) configuration space address for the device that performed the reset operations that caused that root port change, which may be used in the mapping of devices to device slot identifiers. However, one of skill in the art in possession of the present disclosure will recognize that the access method used by the systems and methods of the present disclosure may be modified to utilize legacy PCI configuration (e.g., CFG), port access (e.g., IO or memory mapped IO) while remaining within the scope of the present disclosure as well.

Thus, at block 410, the reset operations performed by the device positioned in the device slot 304a (e.g., the NVMe storage device 500a positioned in the storage device slot 208a) may be detected by the processing system 318 as a root port change in one of the root ports 320a-c that is coupled to the device connector 306a via a particular bus path. Subsequently, the reset operations performed by the device positioned in the device slot 304b (e.g., the NVMe storage device 500b positioned in the storage device slot 208b) may be detected by the processing system 318 as a root port change in one of the root ports 320a-c that is coupled to the device connector 306b via a particular bus path. Subsequently, the reset operations performed by the device positioned in the device slot 304c (e.g., the NVMe storage device 500c positioned in the storage device slot 210a) may be detected by the processing system 318 as a root port change in one of the root ports 320a-c that is coupled to the device connector 306c via a particular bus path. Subsequently, the reset operations performed by the device positioned in the device slot 304d (e.g., the NVMe storage device 500d positioned in the storage device slot 210b) may be detected by the processing system 318 as a root port change in one of the root ports 320a-c that is coupled to the device connector 306d via a particular bus path. Subsequently, the reset operations performed by the device positioned in the device slot 304e (e.g., the NVMe storage device 500e positioned in the storage device slot 212a) may be detected by the processing system 318 as a root port change in one of the root ports 320a-c that is coupled to the device connector 306e via a particular bus path. Subsequently, the reset operations performed by the device positioned in the device slot 304f (e.g., the NVMe storage device 500f positioned in the storage device slot 212b) may be detected by the processing system 318 as a root port change in one of the root ports 320a-c that is coupled to the device connector 306f via a particular bus path.

The method 400 then proceeds to block 412 where the processing system maps detected device(s) with respective slot identifier(s) that correspond to the device slot sequence. In an embodiment, at block 412, the BIOS provided by the processing system 318 may operate at block 412 to map detected device with respective device slot identifiers based on the device slot sequence. For example, the BIOS provided by the processing system 318 may detect the root port change in any of the root ports 320a-c coupled via a particular bus path to a device connector that is connected to a device that performed reset operations and, in response, identify a B:D:F configuration space address for the device that performed those reset operations, and associate that B:D:F configuration address space with a device slot identifier corresponding to the device connector/device slot to which the reset instructions were most recently asserted by the reset controller 310 according to the device slot sequence.

As such, the processing system 318 may detect the root port change in the root port coupled via a bus path to the device connector 306a that is connected to a device (e.g., the NVEm storage device 500a) that performed reset operations based on reset instructions asserted according to the device slot sequence and, in response, identify a B:D:F configuration space address for that device and associate that B:D:F configuration address space with the device slot identifier "0" corresponding to the device connector 306a/device slot 304a/storage device slot 208a. Subsequently, the processing system 318 may detect the root port change in the root port coupled via a bus path to the device connector 306b that is connected to a device (e.g., the NVEm storage device 500b) that performed reset operations based on reset instructions asserted according to the device slot sequence and, in response, identify a B:D:F configuration space address for that device and associate that B:D:F configuration address space with the device slot identifier "1" corresponding to the device connector 306b/device slot 304b/storage device slot 208b. Subsequently, the processing system 318 may detect the root port change in the root port coupled via a bus path to the device connector 306c that is connected to a device (e.g., the NVEm storage device 500c) that performed reset operations based on reset instructions asserted according to the device slot sequence and, in response, identify a B:D:F configuration space address for that device and associate that B:D:F configuration address space with the device slot identifier "2" corresponding to the device connector 306c/device slot 304c/storage device slot 210a.

Subsequently, the processing system 318 may detect the root port change in the root port coupled via a bus path to the device connector 306d that is connected to a device (e.g., the NVEm storage device 500d) that performed reset operations based on reset instructions asserted according to the device slot sequence and, in response, identify a B:D:F configuration space address for that device and associate that B:D:F configuration address space with the device slot identifier "3" corresponding to the device connector 306d/device slot 304d/storage device slot 210b. Subsequently, the processing system 318 may detect the root port change in the root port coupled via a bus path to the device connector 306e that is connected to a device (e.g., the NVEm storage device 500e) that performed reset operations based on reset instructions asserted according to the device slot sequence and, in response, identify a B:D:F configuration space address for that device and associate that B:D:F configuration address space with the device slot identifier "4" corresponding to the device connector 306e/device slot 304e/storage device slot 212a. Subsequently, the processing system 318 may detect the root port change in the root port coupled via a bus path to the device connector 306f that is connected to a device (e.g., the NVEm storage device 500f) that performed reset operations based on reset instructions asserted according to the device slot sequence and, in response, identify a B:D:F configuration space address for that device and associate that B:D:F configuration address space with the device slot identifier "5" corresponding to the device connector 306f/ device slot 304f/storage device slot 212b.

As such, blocks 408-412 of the method 400 may be performed sequentially for each of the device connectors to discovery devices connected to those connectors, and map those devices to device slot identifiers. As such, a first device connected to a first device connector may be reset by the system, be detected via its corresponding reset operations, and mapped to its first device slot as discussed above. Following that mapping, a second device connected to a second device connector may be reset by the system, be detected via its corresponding reset operations, and mapped to its second device slot as discussed above. This may continue until each device connected to a device connector is sequentially discovered and mapped.

The method 400 then proceeds to block 414 where the processing system provides the mappings of the device slot identifier(s) with device(s) for display. In an embodiment, at block 414, the BIOS provided by the processing system 318 (or a CPU provided by the processing system 318) may provide the mappings of the device slot identifiers with the devices for display on a display device (e.g., not illustrated, but which may include the display 110 discussed above with reference to FIG. 1.) For example, mappings of device slot identifier(s) with device(s) provided for display and based on the examples provided with reference to FIGS. 2, 3, and 5 may include:

PCIe SSD in Slot 0 in Bay 1: NVMe PCIe SSD Configuration Data
PCIe SSD in Slot 1 in Bay 1: NVMe PCIe SSD Configuration Data
PCIe SSD in Slot 2 in Bay 1: NVMe PCIe SSD Configuration Data
PCIe SSD in Slot 3 in Bay 1: NVMe PCIe SSD Configuration Data
PCIe SSD in Slot 4 in Bay 1: NVMe PCIe SSD Configuration Data
PCIe SSD in Slot 5 in Bay 1: NVMe PCIe SSD Configuration Data Thus, systems and methods have been described that provide for the dynamic discovery of NVMe storage devices in storage device slots included in a storage device bay, thus eliminating the need to create and maintain static mapping tables. During server device initialization, a BIOS may send instructions to a CPLD to begin a device discovery process, and the CPLD may provide a request to a reset controller on a backplane that provides a storage device bay. The reset controller may then sequentially assert reset instructions through each of a plurality of device connectors on the backplane in a device slot sequence, which causes NVMe storage device(s) connected to the device connectors to sequentially perform reset operations. The processing system will then sequentially detect, via a respective bus path in the server device, each of those NVMe storage devices based on, for example, an associated state change that is registered on a corresponding root port to which the NVME storage device is connected when that NVMe storage device performs the reset operations, which allows the processing system to map each NVMe storage device with a respective device slot identifier that corresponds to the device slot sequence. The processing system may then display the mapping of the device slot identifiers with each device that was detected. As such, flexibility and modularity is enabled in future platform designs, reducing firmware development requirements via the elimination of the need to create and maintain static mapping tables.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An automated device discovery system, comprising:
a chassis defining a plurality of device slots that are each associated with a respective device slot identifier in a device slot identifier sequence;
a plurality of device connectors, wherein a respective device connector is housed in the chassis and located adjacent each of the plurality of device slots such that each of the plurality of device connectors is associated with a respective device slot and corresponding device slot identifier;
at least one bus subsystem that is coupled to each of the plurality of device connectors;
a reset subsystem that is coupled to each of the plurality of device connectors, wherein the reset subsystem includes:
a Complex Programmable Logic Device (CPLD); and
a reset controller that is coupled to the CPLD and the plurality of device connectors; and
a processing system that is coupled to each of the at least one bus system and the reset subsystem via the CPLD, wherein the processing system is configured to:
provide an instruction to the CPLD to detect devices coupled to the plurality of device connectors, wherein the instruction causes the CPLD to generate and transmit a request to the reset controller to sequentially assert reset instructions through each of the plurality of device connectors in a device slot sequence that follows the device slot identifier sequence, wherein each sequentially asserted reset instruction is configured to cause a respective device that is located in one of the respective device slots and coupled to that device connector to perform a reset operation;
sequentially detect, via a respective bus path in the at least one bus subsystem, each respective device that is located in one of the plurality of device slots and coupled to the respective device connector for that device slot based on the reset operation performed by that device in response to the sequentially asserted reset instructions; and
map, in a database, each device that was detected with the device slot identifier that corresponds to the device slot sequence in which the reset instructions were asserted.

2. The system of claim 1, wherein the processing system includes a Basic Input/Output System (BIOS) that is configured to cause the reset subsystem to sequentially assert the reset instructions, and configured to sequentially detect each device, during system initialization operations.

3. The system of claim 1, wherein the sequentially detecting each device includes:
detecting a root port change corresponding to each device that performs reset operations in response to the sequentially asserted reset instructions.

4. The system of claim 3, wherein each root port change corresponds to a respective Bus:Device:Function (B:D:F) for the device that performed the reset operations, and wherein associating each device that was detected with a respective device slot identifier includes associating the B:D:F for the device that was detected with the respective device slot identifier.

5. The system of claim 1, wherein the processing system is configured to:
display the mappings of the device slot identifiers with each device that was detected.

6. An Information Handling System (IHS), comprising:
a processing system; and
a memory system that is coupled to the processing system and that includes instructions that, when executed by the processing system, cause the processing system to:
provide an instruction to a Complex Programmable Logic Device (CPLD) that is included in a reset subsystem, wherein the instruction causes the CPLD to generate and transmit a request to a reset controller that is included in the reset subsystem to cause the reset controller to sequentially assert reset instructions in a device slot sequence through a plurality of device connectors that are each located adjacent a respective device slot that is defined by a chassis and that is associated with a respective device slot identifier in a device slot identifier sequence, wherein each of the plurality of device connectors is associated with a respective device slot and corresponding device slot identifier, wherein the device slot sequence follows the device slot identifier sequence, and wherein each sequentially asserted reset instruction is configured to cause a respective device that is located in one of the respective device slots and coupled to one of the plurality device connectors to perform a reset operation;

sequentially detect, via a respective bus path in at least one bus subsystem that is coupled to each of the plurality of device connectors, each respective device that is located in one of the respective device slots and coupled to one of the plurality of device connectors based on the reset operation performed by that device in response to the sequentially asserted reset instructions; and map, in a database, each device that was detected with the device slot identifier that corresponds to the device slot sequence in which the reset instructions were asserted.

7. The IHS of claim 6, wherein the processing system includes a Basic Input/Output System (BIOS) that is configured to cause the reset subsystem to sequentially assert the reset instructions, and configured to sequentially detect each device, during system initialization operations.

8. The IHS of claim 6, wherein the sequentially detecting each device includes:

detecting a root port change corresponding to each device that performs reset operations in response to the sequentially asserted reset instructions.

9. The IHS of claim 8, wherein each root port change corresponds to a respective Bus:Device:Function (B:D:F) for the device that performed the reset operations, and wherein associating each device that was detected with a respective device slot identifier includes associating the B:D:F for the device that was detected with the respective device slot identifier.

10. The IHS of claim 6, wherein the memory system includes instructions that, when executed by the processing system, cause the processing system to:

provide, for display on a display device, the mappings of the device slot identifiers with each device that was detected.

11. The IHS of claim 6, wherein each device is provided by a Non-Volatile Memory express (NVMe) storage device.

12. A method for automatically discovering devices, comprising:

providing, by a processing system, an instruction to a Complex Programmable Logic Device (CPLD) that is included in a reset subsystem, wherein the instruction causes the CPLD to generate and transmit a request to a reset controller that is included in the reset subsystem to cause the reset controller to sequentially assert reset instructions in a device slot sequence through a plurality of device connectors that are each located adjacent a respective device slot that is defined by a chassis and that is associated with a respective device slot identifier in a device slot identifier sequence, wherein each of the plurality of device connectors is associated with a respective device slot and corresponding device slot identifier, wherein the device slot sequence follows the device slot identifier sequence, and wherein each sequentially asserted reset instruction is configured to cause a respective device that is located in one of the respective device slots and coupled to one of the plurality device connectors to perform a reset operation;

sequentially detecting, by the processing subsystem via a respective bus path in at least one bus subsystem that is coupled to each of the plurality of device connectors, each respective device that is located in one of the respective device slots and coupled to one of the plurality of device connectors based on the reset operation performed by that device in response to the sequentially asserted reset instructions; and mapping, by the processing system in a database, each device that was detected with the device slot identifier that corresponds to the device slot sequence in which the reset instructions were asserted.

13. The method of claim 12, wherein the processing system includes a Basic Input/Output System (BIOS) that causes the reset subsystem to sequentially assert the reset instructions, and that sequentially detects each device, during system initialization operations.

14. The method of claim 12, wherein the sequentially detecting each device includes:

detecting a root port change corresponding to each device that performs reset operations in response to the sequentially asserted reset instructions.

15. The method of claim 14, wherein each root port change corresponds to a respective Bus:Device:Function (B:D:F) for the device that performed the reset operations, and wherein associating each device that was detected with a respective device slot identifier includes associating the B:D:F for the device that was detected with the respective device slot identifier.

16. The method of claim 12, further comprising:

providing, by the processing system for display on a display device, the mappings of the device slot identifiers with each device that was detected.

17. The method of claim 12, wherein each device is provided by a Non-Volatile Memory express (NVMe) storage device.

* * * * *